United States Patent
Han et al.

(10) Patent No.: US 7,088,647 B2
(45) Date of Patent: Aug. 8, 2006

(54) APPARATUS OF CONTROLLING TRACKING FOR A DISK

(75) Inventors: Yong Hee Han, Junjoo-si (KR); Sung Woo Park, Daegu-si (KR)

(73) Assignee: LG Electronics Inc., Seoul (KR)

( * ) Notice: Subject to any disclaimer, the term of this patent is extended or adjusted under 35 U.S.C. 154(b) by 435 days.

(21) Appl. No.: 10/268,984

(22) Filed: Oct. 11, 2002

(65) Prior Publication Data

US 2003/0086342 A1 May 8, 2003

(30) Foreign Application Priority Data

Oct. 12, 2001 (KR) .............................. 2001-63107

(51) Int. Cl.
*G11B 7/095* (2006.01)
(52) U.S. Cl. ................. 369/44.32; 369/53.14
(58) Field of Classification Search .................... None
See application file for complete search history.

(56) References Cited

U.S. PATENT DOCUMENTS

| | | | | |
|---|---|---|---|---|
| 5,644,560 A | * | 7/1997 | Hori ........................ | 369/44.34 |
| 5,717,679 A | * | 2/1998 | Mashimo et al. ...... | 369/124.04 |
| 6,118,739 A | * | 9/2000 | Kishinami et al. ........ | 369/44.28 |
| 6,768,705 B1 | * | 7/2004 | Hirai ........................ | 369/44.28 |
| 2001/0019524 A1 | * | 9/2001 | Na ........................... | 369/53.14 |

* cited by examiner

*Primary Examiner*—William Korzuch
*Assistant Examiner*—Michael V. Battaglia
(74) *Attorney, Agent, or Firm*—Birch, Stewart, Kolasch & Birch, LLP

(57) ABSTRACT

An apparatus includes a controller storing information on dense/sparse state of the tracking error signal in connection with characteristic of the signal generated by a phase encoder while tracking servo of a servo unit is inactivated, and, in data reproduction mode, identifying a current disk phase based on characteristic of the signal generated by the phase encoder, and adjusting tracking characteristic of the servo unit based on the stored information in connection with the signal characteristic in order to compensate an effect rate of eccentricity on the identified disk phase. Through minute adjustment of servo characteristic for each disk phase, error range of TE signal to track in real time is reduced. Therefore, tracking for an eccentric disk becomes easier and more reliable.

10 Claims, 5 Drawing Sheets

201 (ideal trajectory of an optical pickup)

202 (trajectory of an optical pickup on an eccentric disk)

| Phase Section | Dense/Thin | Effect Rate of Eccentricity | Range of Duty Ratio |
|---|---|---|---|
| d-a | sparse | 13 | 10 ~ 30 |
| a-b | dense | 30 | 30 ~ 50 |
| b-c | sparse | 9 | 50 ~ 70 |
| c-d | dense | 30 | 70 ~ 90 |

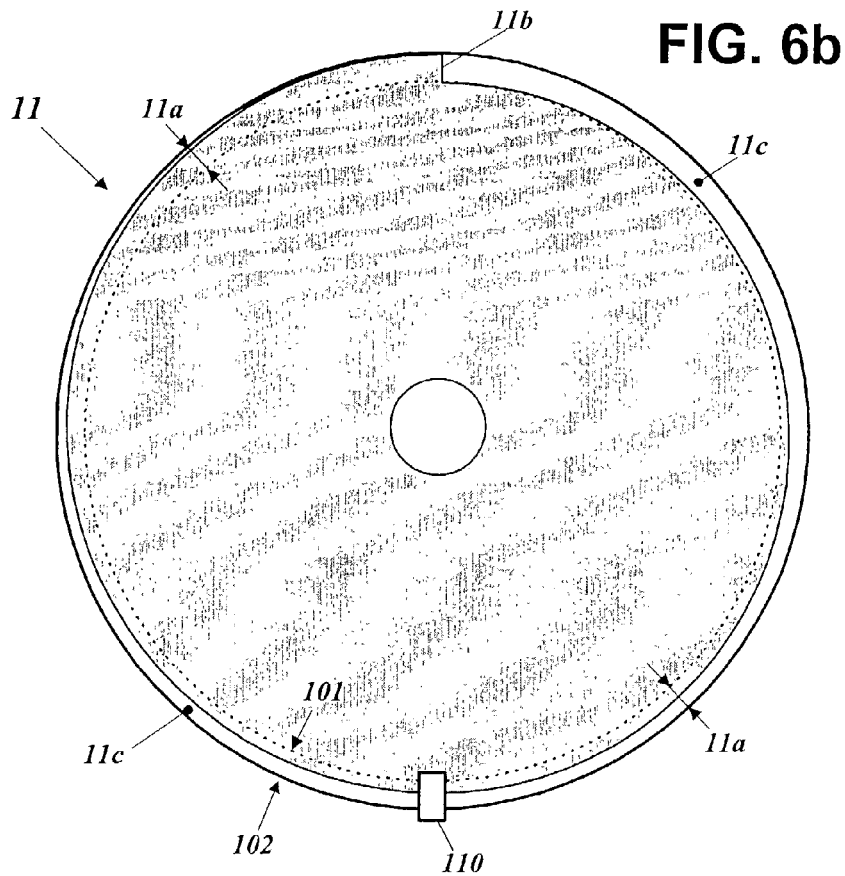
FIG. 6b
FIG. 6c
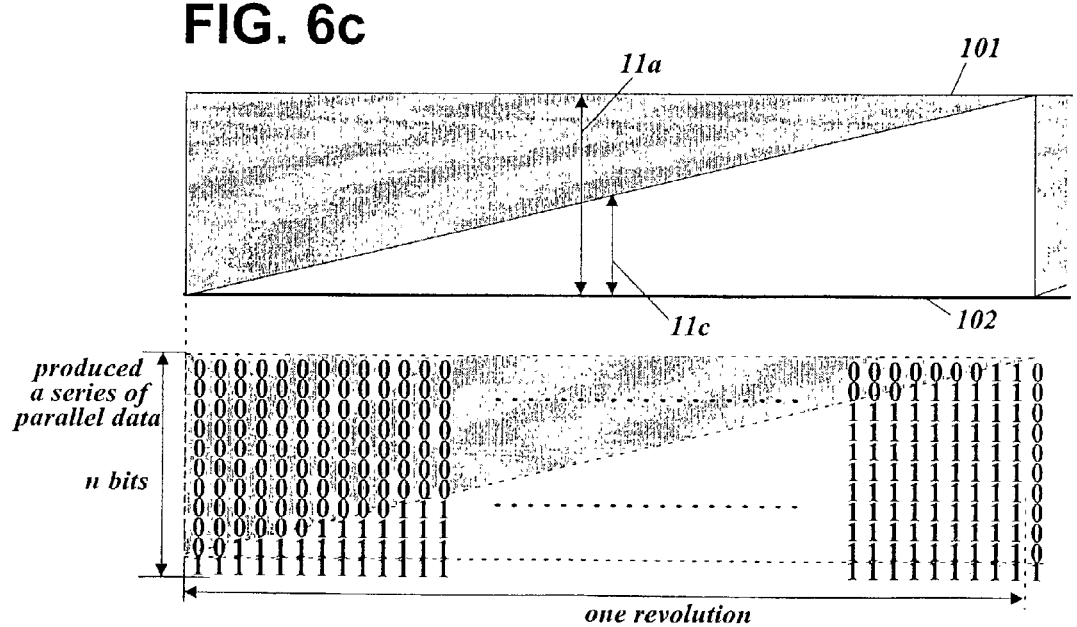

FIG. 6d

| Phase Section | Dense/Thin | Effect Rate of Eccentriciy | Range of Duty Ratio |
|---|---|---|---|
| d-a | sparse | 13 | ~ 0.25n |
| a-b | dense | 30 | 0.25n ~ 0.5n |
| b-c | sparse | 9 | 0.5n ~ 0.75n |
| c-d | dense | 30 | 0.75n ~ n |

*total : n bits from photo detector 18*

US 7,088,647 B2

APPARATUS OF CONTROLLING TRACKING FOR A DISK

This nonprovisional application claims priority under 35 U.S.C. § 119(a) on patent application Ser. No. 2001-0063107 filed in KOREA on Oct. 12, 2001, which is herein incorporated by reference.

BACKGROUND OF THE INVENTION

1. Field of the Invention

The present invention relates to a tracking control apparatus for a disk recording medium, more particularly, to an apparatus of measuring how much an eccentricity affects each phase of a disk and controlling disk tracking based on the measured each effect rate.

2. Description of the Related Art

In general, most of the disks become eccentric during rotation because of variation in disk manufacturing or disk clamping condition. If an eccentricity of a disk is too high to conduct an exact tracking, it is difficult to reproduce data from the disk normally.

To overcome such a bad situation, a disk device measures an eccentricity of a disk and adjusts characteristic of a tracking servo to compensate the measured eccentricity at a start-up operation.

A conventional eccentricity measuring method rotates a placed disk with a tracking servo off, counts pulse train produced every track cross of an optical pickup and disk revolutions, and divides the pulse count by the number of disk revolutions. Because the value resulted from the division represents how much a disk is eccentric, gains of a tracking servo are adjusted based on the eccentricity measured as above to compensate eccentricity of the disk overall.

However, even though eccentricity of a disk is high, the high eccentricity has different effects on respective disk phases. Namely, a certain disk phase is affected less by the high eccentricity than other phases.

Nevertheless, if gains of a tracking servo are increased to make more sensitive to compensate an eccentricity overall irrespective of different effect of eccentricity on respective disk phases, a tracking servo may diverge unexpectedly, namely, an objective lens of an optical pickup may be biased to the utmost side when a scratch is encountered on a disk phase an eccentricity has small effect on.

SUMMARY OF THE INVENTION

It is an object of the present invention to provide a disk tracking control apparatus that measures how much an eccentricity of a rotating disk affects respective disk phases and that adjusts characteristic of a tracking servo minutely according to the measured individual effect on each disk phase.

A disk device of reproducing data from a disk recording medium in accordance with the present invention is characterized in that it comprises: reading means reading signals written on a rotating recording medium and producing recorded signals and a tracking error signal out of the read signals; a phase encoder generating a signal of which characteristic varies according to phase of the rotating disk; a servo unit controlling tracking of an objective lens equipped in said reading means; and a controller storing information on dense/sparse state of the tracking error signal in connection with characteristic of the signal generated by said phase encoder while tracking servo of said servo unit is inactivated, and, in data reproduction mode, identifying a current disk phase based on characteristic of the signal generated by said phase encoder, and adjusting tracking characteristic of said servo unit based on the stored information in connection with the signal characteristic in order to compensate an effect rate of eccentricity on the identified disk phase.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 6b is a plane view of a disk with a phase identifiable transparent circle-band structured in accordance with the second embodiment of the present invention;

FIG. 6c illustrates data of which 1's (or 0's) ratio varies in accordance with disk phrase in the second embodiment of the present invention; and FIG. 6d shows an exemplary information table where effect rates of eccentricity on respective disk phases are written in connection with corresponding disk phases in accordance with the second embodiment of the present invention.

DETAILED DESCRIPTION OF THE PREFERRED EMBODIMENTS

In order that the invention may be fully understood, a preferred embodiment thereof will now be described with reference to the accompanying drawings.

Figure 1:
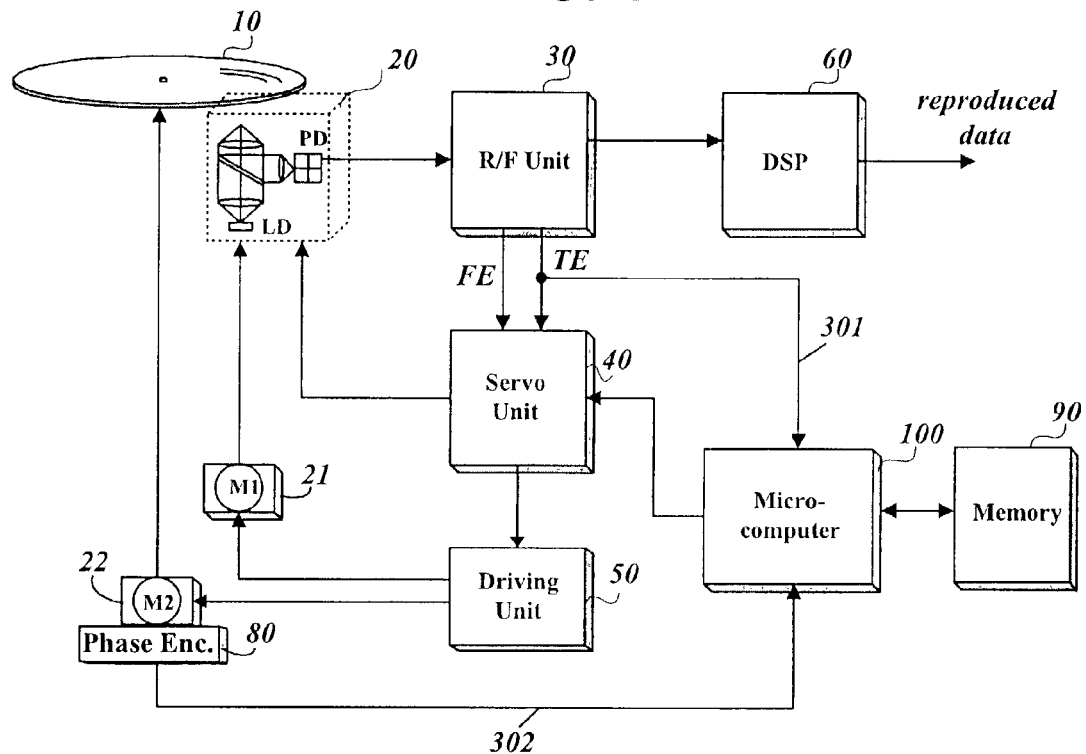
FIG. 1 is a simplified block diagram of a disk device in which the first embodiment of a disk tracking control method of the present invention is embedded.

FIG. 1 is a simplified block diagram of a disk device in which the first embodiment of a disk tracking control method of the present invention is embedded.

The disk device of FIG. 1 comprises an optical pickup 20 for reading written signals from the surface of an optical disk 10; an R/F unit 30 for producing binarized signals and a TE (Tracking Error) and a FE (Focusing Error) signal through filtering and combining the signals detected by the pickup 20; a driving unit 50 for driving a sled motor 21 to move the optical pickup 20 and a spindle motor 22 to rotate the disk 10; a servo unit 40 for conducting tracking/focusing operation of an objective lens in the pickup 20 and controlling the driving unit 50 to rotate the disk 10 at a constant speed; a digital signal processing unit 60 for restoring original data from the binarized signals using a self clock synchronized with the binarized signals in phase; a phase encoder 80 for generating a pulse train with duty ratio varying cyclically during rotation of the spindle motor 22; a memory 90 for storing data; and a microcomputer 100 for controlling an overall reproducing operation, especially, for measuring eccentricity effect on each disk phase based on the pulses from the phase encoder 80 and adjusting tracking servo characteristic of the servo unit 40 according to measured individual eccentricity effect.

Figures 3, 4:
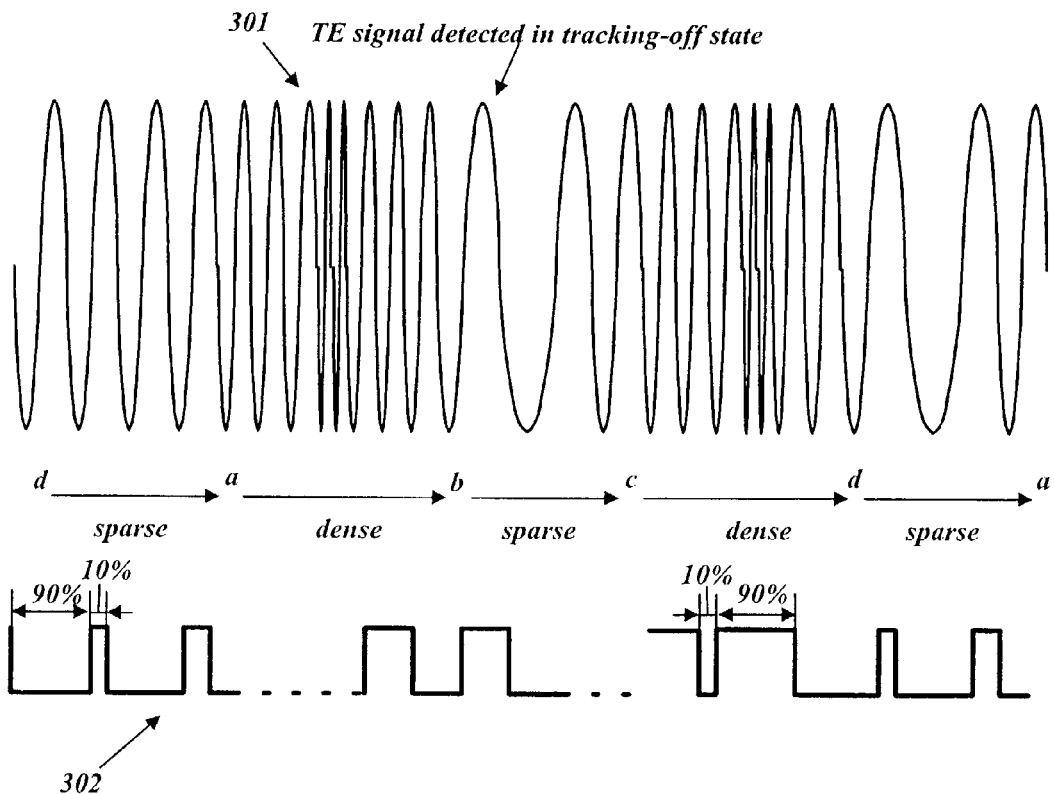
FIG. 3 shows an illustrative TE signal produced from a disk rotating eccentrically in the tracking-off state and a pulse train of which duty ratios are different.
FIG. 4 shows an information table where effect rates of eccentricity on respective disk phases are written in connection with corresponding disk phases in accordance with the first embodiment of the present invention.

When the disk 10 is placed on a tray (not shown) equipped in the disk device, the microcomputer 100 controls the driving unit 50 through the servo unit 40 to rotate the placed disk 10 in CLV (Constant Linear Velocity) manner by the spindle motor 22. While the disk 10 is rotated, the phase encoder 80 outputs successive pulses that have different duty ratios cyclically, e.g., pulses 302 with increasing duty ratio as shown in FIG. 3. The pulses are applied to the microcomputer 100. The phase encoder 80 may be implemented with an FG signal generator that is integrated in the spindle motor 22 in general.

The microcomputer 100 controls the servo unit 40 to turn a focusing servo on and a tracking servo off. This state with focusing on and tracking off is called 'traverse state'.

Figure 2:
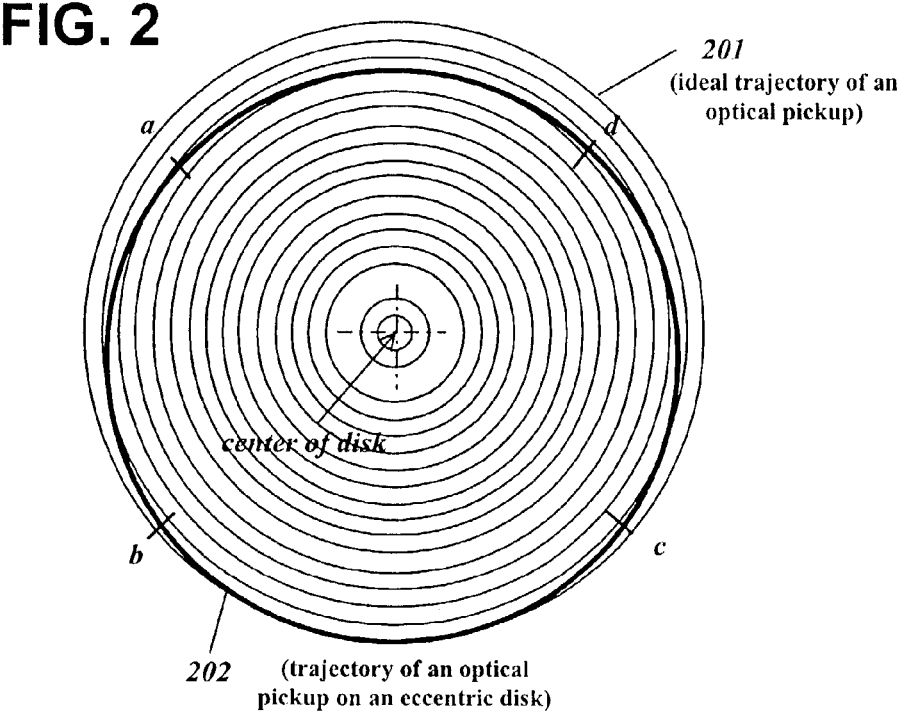
FIG. 2 illustrates a trajectory of an optical pickup on an eccentric disk.

If the disk 10 is little eccentric during rotation, an objective lens of the optical pickup 20 would form an ideal trajectory 201 on the disk 10 in traverse state as illustrated in FIG. 2, otherwise, it would form an undesirable trajectory 202.

Therefore, TE signal would be produced like as 301 of FIG. 3 in case of an eccentric disk. For example, if the trajectory 202 of FIG. 2 is partitioned into four phases, sinusoidal TE signal is dense at phases 'a-b' and 'c-d' and sparse 'b-c' and 'd-a'.

The waveform 301 of TE signal drawn, in FIG. 3 is produced only when tracking servo is off. Namely, TE signal is not produced like as FIG. 3 in case that tracking servo is activated to record/reproduce data from a disk.

The microcomputer 100 samples the TE signal, and pulses from the phase encoder 80 simultaneously and stores sampled data in the memory 90.

After the disk 10 rotates at least once, the microcomputer 100 analyses the sampled data in the memory 80. Through the analysis, the microcomputer 100 identifies dense and sparse section of the TE signal and examines ranges of duty ratio of the pulses for respective dense and sparse sections at the same time. In the analysis, if values of successive sampled data show rapid change it is dense section and if do smooth change it is sparse section. As another way, a section having relatively more peak values is judged dense and the other section is sparse.

In addition, the microcomputer 100 counts the number of peak values (or vibrations) for respective dense and sparse sections to measure effect rate of eccentricity on each section. Each count is stored in connection with corresponding section. Finally, a desirable information table is constructed in the memory 90 as illustrated in FIG. 4. Each turning point from dense to sparse and vice verse is determined to a boundary between dense and sparse section.

After construction of the information table like as FIG. 4, if disk reproduction is requested the microcomputer 100 moves the pickup 20 to an initial or a target position in order to reproduce data from the disk 10. At the same time, the microcomputer 100 calculates duty ratio of pulses outputted from the phase encoder 80.

And, the microcomputer 100 identifies which range among the stored variation of duty ratio in the memory 90 the calculated duty ratio belongs to. For example, if the calculated duty ratio is about 40%, the microcomputer 100 judges a current disk phase to 'a-b' referring to the information table of FIG. 4.

Because the information table shows that the disk phase 'a-b' is badly affected by disk eccentricity, possibility of tracking error is relatively high in this disk phase. Thus, the microcomputer 100 increases gains of the tracking servo or an amplifying rate of the TE signal in proportion to effect rate at the detected disk phase 'a-b'. Consequently, the tracking servo becomes so sensitive that it can track better even in a bad disk phase where a track swings severely.

If the calculated duty ration is about 60%, the current phase is determined to 'b-c' where effect rate of eccentricity is relatively low. Thus, the microcomputer 100 makes the tracking servo insensitive. Because of insensitiveness of the tracking servo, the tracking servo is less likely to diverge even though unexpected noise of TE signal arises in the disk phase of low effect-rate of eccentricity.

In addition, because the microcomputer 100 is able to know how much a next track following current one on the identified disk phase is affected by disk eccentricity, it can adjust characteristic of the tracking servo to meet a next track in advance before the next track arrives. For example, if the calculated duty ratio is about 50%, which means that the current phase is 'a-b', it can be known that a next disk phase (phase 'b-c') is less affected by disk eccentricity. Therefore, the microcomputer 100 may make the tracking servo of present high-sensitivity insensitive before the pickup 20 reaches the phase 'b-c'. If characteristic of the tracking servo is adjusted beforehand, tracking servo operates with low sensitivity as soon as a track on the phase 'b-c' is reproduced.

Figure 5:
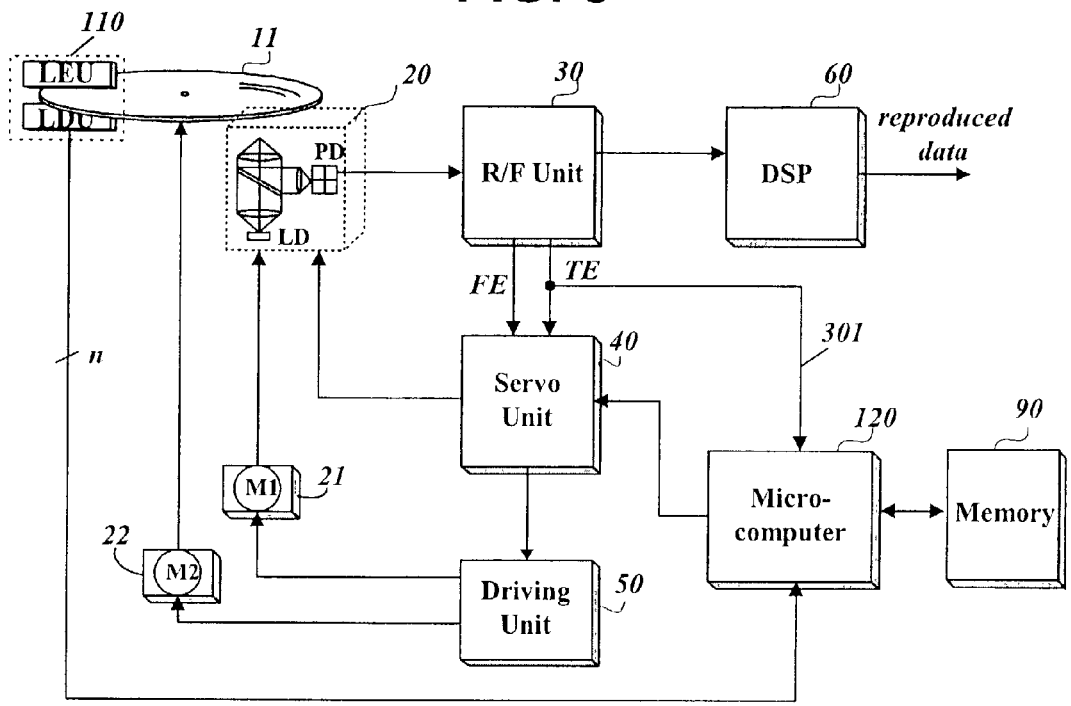
FIG. 5 is a simplified block diagram of a disk device in which the second embodiment of a disk tracking control method of the present invention is embedded.

FIG. 5 is another simplified block diagram of a disk device in which the second embodiment of a disk tracking control method of the present invention is embedded. The disk device shown in FIG. 5 replaces the phase encoder 80 encoding rotation angle of the spindle motor 22 with a phase encoder 110 encoding phase directly from a placed disk. The other elements are same as the disk device of FIG. 1.

Figure 6A:
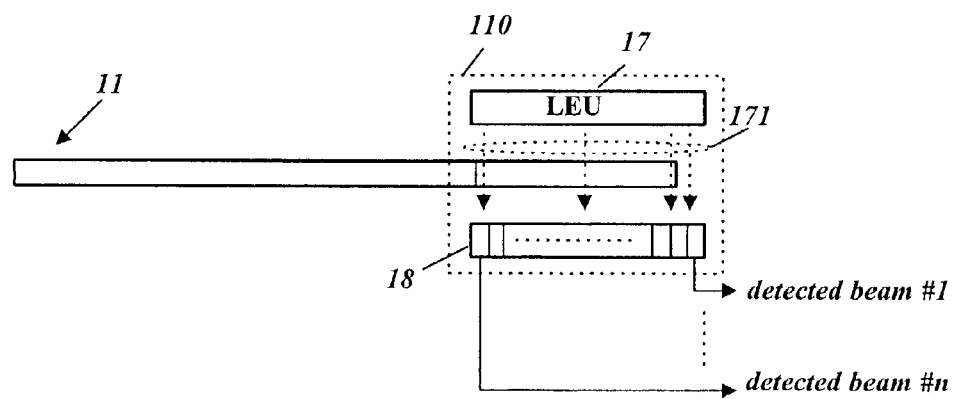
FIG. 6a shows an arrangement of a phase encoder shown in FIG. 5 with respect to a placed disk.

The phase encoder 110 of FIG. 5, as shown in FIG. 6a, includes a light emitting unit (LEU) 17 radiating a planar beam arranged radially with respect to a placed disk onto the disk; and a light detecting unit (LDU) 18 that is composed of a series of photo diodes or photo transistors detecting the planar beam individually.

The LEU 17 may be implemented with a series of laser diodes arranged in a line or with a single light emitting element and an enclosing box of which bottom has parallel slits that transform a light from the light emitting element into parallel individual beams.

Furthermore, a disk 11 for this embodiment has a phase identifying circle-band 11a along outermost circle 102 as shown in FIG. 6b. The phase identifying circle-band 11a includes a transparent inner circle-band 11c of which width varies linearly from 0 at a certain start line 11b to full width of the phase identifying band 11a at that line 11b.

The phase encoder 110 is placed to cover above and below the phase identifying circle-band 11a of the disk 11 as shown in FIG. 6a.

A microcomputer 120 included in the disk device of FIG. 5 has as many input ports as the outputs of the phase encoder 110 as shown in FIG. 5. Namely, each input port of the microcomputer 120 is connected to an output pin of each photo diode or photo transistor.

While the disk 11 structured as above is rotated in the disk device of FIG. 5, the parallel beams 171 from the LEU 17 of the phase encoder 110 are incident to the LDU 18 at the opposite side only through the transparent inner circle-band 11c formed in the phase identifying circle-band 11a. Therefore, the microcomputer 120 receives n-bit data sequentially in the form of FIG. 6c through its input ports while the disk 11 rotates.

The microcomputer 120 identifies a current disk phase based on the ratio of ones (or zeros) to n bits inputted from the phase encoder 110.

Afterwards, the microcomputer 120 measures disk eccentricity based on vibration of TE signal and effect rate of eccentricity on each of partitioned disk phases in the traverse state the same as in the first embodiment. The measured quantities are stored in the memory 90. FIG. 6d shows an exemplary information table including the measured quantities.

During data reproduction (or record), a current disk phase is identified from the ratio of ones (or zeros), to n-bit data outputted simultaneously from the phase encoder 110, and effect rate of eccentricity on the identified disk phase is known from the information table stored in FIG. 6d. Finally, characteristic of the tracking servo is adjusted accordingly to meet the known effect rate of eccentricity on that phase. This shortly-explained operation is totally same with the first embodiment explained in detail before.

The above-explained disk tracking control method adjusts servo characteristic for each disk phase to match with different effect rate of eccentricity on each disk phase. Thus, an error range of TE signal to track in real time is reduced, whereby, tracking for an eccentric disk becomes easier and more reliable.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A disk device of reading data from a disk recording medium, comprising:
    reading means reading signals written on a rotating recording medium and producing recorded signals and a tracking error signal out of the read signals;
    a phase encoder generating a signal of which characteristic varies according to phase of the rotating disk;
    a servo unit controlling tracking of an objective lens equipped in said reading means; and
    a controller storing information on dense/sparse state of the tracking error signal in connection with characteristic of the signal generated by said phase encoder while tracking servo of said servo unit is inactivated, and, in data reproduction mode, identifying a current disk phase based on characteristic of the signal generated by said phase encoder, and adjusting tracking characteristic of said servo unit based on the stored information in connection with the signal characteristic in order to compensate an effect rate of eccentricity on the identified disk phase, wherein said controller adjusts the tracking characteristic of said servo unit to sensitive if the signal characteristic stored in connection with the identified disk phase shows dense.

2. The disk device of claim 1, wherein the signal characteristic is the ratio of ones or zeros to parallel bits.

3. The disk device of claim 2, wherein said phase encoder is composed of a light emitting unit radiating parallel beams and a light detecting unit receiving the parallel beams, both units being installed in radial direction above and below an outermost circumference of the recording medium.

4. The disk device of claim 2, wherein said phase encoder outputs parallel bits where the ratio of ones or zeros varies according to what portion of parallel beams passes through a transparent circle-band formed along an outermost circumference of the recording medium, the transparent circle-band varying linearly in width.

5. The disk device of claim 1, wherein said controller checks effect rate of eccentricity on a next phase to the identified disk phase, and adjusts the tracking characteristic of said servo unit in advance before the next phase arrives.

6. The disk device of claim 1, wherein said controller adjusts the tracking sensitivity of said servo unit in proportion to the number of sinusoidal waves of the tracking error signal that is stored in connection with the identified disk phase.

7. The disk device of claim 1, wherein said controller considers the recording medium to be partitioned into four phases.

8. A disk device of reading data from a disk recording medium, comprising:
    reading means reading signals written on a rotating recording medium and producing recorded signals and a tracking error signal out of the read signals;
    a phase encoder generating a signal of which characteristic varies according to phase of the rotating disk;
    a servo unit controlling tracking of an objective lens equipped in said reading means; and
    a controller storing information on dense/sparse state of the tracking error signal in connection with characteristic of the signal generated by said phase encoder while tracking servo of said servo unit is inactivated, and, in data reproduction mode, identifying a current disk phase based on characteristic of the signal generated by said phase encoder, and adjusting tracking characteristic of said servo unit based on the stored information in connection with the signal characteristic in order to compensate an effect rate of eccentricity on the identified disk phase, wherein the signal characteristic is duty ratio.

9. The disk device of claim 8, wherein said phase encoder is integrated to a motor rotating the recording medium.

10. A disk device of reading data from a disk recording medium, comprising:
    reading means reading signals written on a rotating recording medium and producing recorded signals and a tracking error signal out of the read signals;
    a phase encoder generating a signal of which characteristic varies according to phase of the rotating disk;
    a servo unit controlling tracking of an objective lens equipped in said reading means; and
    a controller storing information on dense/sparse state of the tracking error signal in connection with characteristic of the signal generated by said phase encoder while tracking servo of said servo unit is inactivated, and, in data reproduction mode, identifying a current disk phase based on characteristic of the signal generated by said phase encoder, and adjusting tracking characteristic of said servo unit based on the stored information in connection with the signal characteristic in order to compensate an effect rate of eccentricity on the identified disk phase, wherein said controller adjusts the tracking characteristic of said servo unit to insensitive if the signal characteristic stored in connection with the identified disk phase shows sparse.

* * * * *